(12) United States Patent
Tanaka et al.

(10) Patent No.: US 7,483,714 B2
(45) Date of Patent: *Jan. 27, 2009

(54) RANGING AND POSITIONING SYSTEM, RANGING AND POSITIONING METHOD, AND RADIO COMMUNICATION APPARATUS

(75) Inventors: Katsuyuki Tanaka, Kanagawa (JP); Mitsuhiro Suzuki, Chiba (JP); Shin Saito, Kanagawa (JP); Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 11/563,959

(22) Filed: Nov. 28, 2006

(65) Prior Publication Data

US 2007/0099646 A1    May 3, 2007

Related U.S. Application Data

(63) Continuation of application No. 10/779,628, filed on Feb. 18, 2004, now abandoned.

(30) Foreign Application Priority Data

Feb. 28, 2003    (JP)    ............................... 2003-052274

(51) Int. Cl.
    *H04B 7/00*    (2006.01)
(52) U.S. Cl. ...................... 455/522; 455/69; 455/456.1
(58) Field of Classification Search .............. 455/456.6, 455/456.1, 67.11, 423, 127.1, 522, 69; 342/357.1
    See application file for complete search history.

(56) References Cited

U.S. PATENT DOCUMENTS

| 4,667,202 | A | 5/1987 | Kammerlander et al. |
| 7,065,325 | B2 * | 6/2006 | Zegelin et al. ........... 455/67.11 |
| 2003/0046022 | A1 * | 3/2003 | Silverman ................... 702/150 |
| 2003/0103475 | A1 * | 6/2003 | Heppe et al. ................ 370/321 |
| 2003/0144006 | A1 * | 7/2003 | Johansson et al. ........... 455/456 |
| 2003/0214933 | A1 * | 11/2003 | Margon ..................... 370/342 |
| 2004/0203989 | A1 * | 10/2004 | Karaoguz ................... 455/522 |
| 2004/0214521 | A1 * | 10/2004 | Tsunehara et al. ......... 455/3.01 |
| 2004/0235495 | A1 | 11/2004 | Bar et al. |
| 2005/0030904 | A1 * | 2/2005 | Oom Temudo de Castro et al. ......................... 370/252 |
| 2005/0265321 | A1 * | 12/2005 | Rappaport et al. .......... 370/352 |

* cited by examiner

*Primary Examiner*—Charles N Appiah
*Assistant Examiner*—Joy K Contee
(74) *Attorney, Agent, or Firm*—Oblon, Spivak, McClelland, Maier & Neustadt, P.C.

(57) ABSTRACT

A system and method for performing ranging and positioning as follows by using the procedure for packet transmission and reception between a sender and a recipient. A first radio set transmits packets to a second radio set as a recipient. The second radio set returns the packets without fail after the lapse of time (from the detection of packets) which corresponds to an integral multiple of a prescribed unit time. The first radio set counts, by using its counter, the time which has elapsed from its transmission of packets to its detection of packets from the second radio set. The remainder of the thus counted time after subtraction of the time taken by the second radio set from packet detection to packet return and the processing time of the first radio set itself is converted into the distance of propagation between the first radio set and the second radio set as a recipient.

16 Claims, 7 Drawing Sheets

F I G. 7
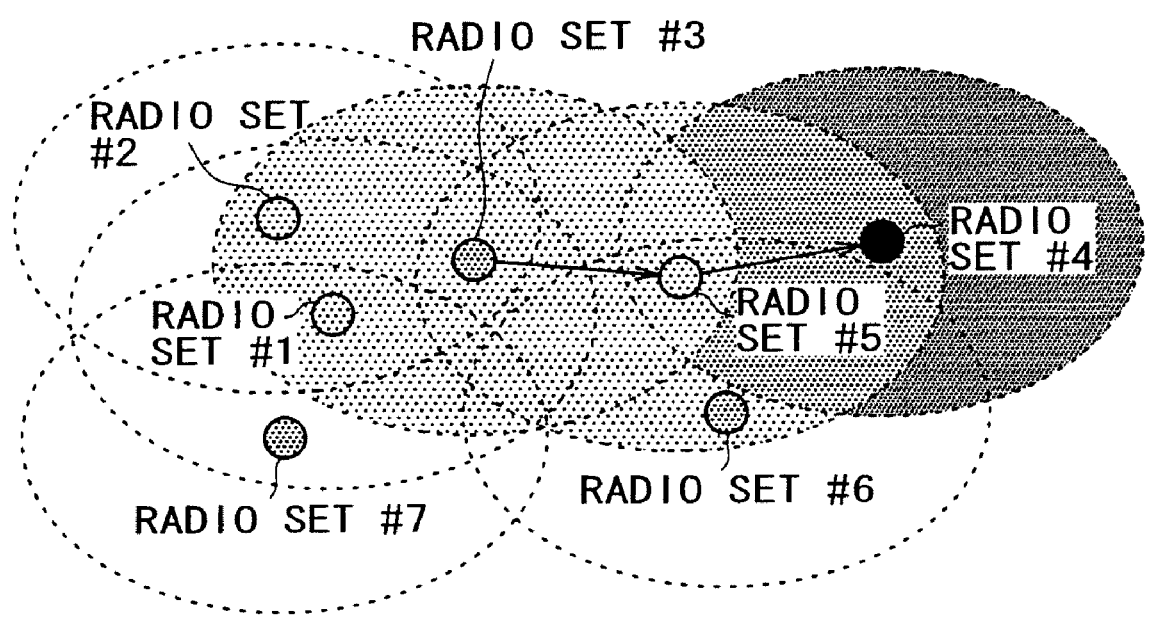

RANGING AND POSITIONING SYSTEM, RANGING AND POSITIONING METHOD, AND RADIO COMMUNICATION APPARATUS

CROSS-REFERENCE TO RELATED APPLICATIONS

This application is a Continuation of U.S. patent application Ser. No. 10/779,628, filed Feb. 18, 2004, and claims priority to Japanese Patent Application No. 2003-052274, filed Feb. 28, 2003. The contents of U.S. patent application Ser. No. 10/779,628 are incorporated herein by reference in their entirety.

BACKGROUND OF THE INVENTION

1. Field of the Invention

The present invention relates to a ranging and positioning system, a ranging and positioning method, and a radio communication apparatus for measurement of a relative distance between two objects, and particularly to a ranging and positioning system, a ranging and positioning method, and a radio communication apparatus for measurement of a relative distance between two objects by means of radio waves.

More particularly, the present invention relates to a ranging and positioning system, a ranging and positioning method, and a radio communication apparatus for measurement of a relative distance between two radio sets which transmit and receive packets to and from each other, and specifically to a ranging and positioning system, a ranging and positioning method, and a radio communication apparatus for ranging and positioning by means of the procedure for packet transmission and reception between a sender and a recipient.

2. Description of the Related Art

There has existed for a long time the ranging and positioning system relying on radio waves, which is exemplified by the radar which utilizes reflection of radio waves or the radio navigation system which employs more than one reference station.

Loran and GPS (Global Positioning System) are capable of positioning with the help of radio equipment which simply receives signals, because reference stations are strictly synchronized with one another.

Other positioning methods than Loran and GPS include the one which uses radio waves from base stations for portable telephones (patent literature 1) and the one which uses radio waves for television (non-patent literature 1 and patent literature 2). They are basically the same although the latter makes corrections according to data received from a separate base station in order to monitor deviation from synchronization because it lacks strict synchronization.

Vehicular communications by ITS (intelligent transport system) employ a ranging system called "Boomerang System" to measure the distance between motor vehicles. This system does not require radio sets to be synchronized with each other. It performs ranging in the following manner, for example. A radio set which wants to perform ranging transmits signals. The other radio set, which is an object for ranging, receives the signals and sends them back together with its own information superimposed thereon. The first radio set to perform ranging measures the time required for radio waves to go and come back. In this way it achieves its objective.

According to the above-mentioned method, the radio set as an object for ranging simply returns the received signals without further processing. There is another system to estimate distances from the period of time taken from transmission of signals by the radio set which wants to measure distance to reception of returned signals by the radio set as an object for ranging. The period of time includes the signal processing time taken by both of the radio sets. (patent literature 3).

There has recently been developed a new radio communication system called "ultra-wide band (UWB) communication". It performs radio communication by superimposing information on a train of extremely weak impulses. Its practical use is expected for short distance transmission at ultra-high speeds. (non-patent literature 2).

The UWB transmission system falls into two categories. The first one is "DS-UWB system" in which the rate of spreading of DS information signals is increased to extremes. The second one is "impulse UWB system" in which information signals to be transmitted and received are constructed of a train of impulses having a very short period (say, some hundreds of picoseconds). Both systems employ extremely spread frequency bands (from 3 to 10 GHz) to transmit and receive signals, thereby achieving high-speed data transmission. They have an occupied band width (of the order of gigahertz) such that the quotient of the occupied band width divided by the center frequency (say, 1 to 20 GHz) is approximately 1. Thus, their band width is much broader than those which are usually used for wireless LAN based on W-CDMA system, cdma 2000 system, SS (spread spectrum) system, or OFDM (orthogonal frequency division multiplexing) system.

The UWB communication system employs extremely short pulses and hence has a high time resolution. With the help of this characteristic, it can perform ranging and positioning. The recent UWB communication system can perform ranging in addition to high-speed data transmission in excess of 100 Mbps.

WPAN (wireless personal access network) for short distance communications, which is typified by UWB, is expected to be installed in every domestic appliance and consumer electronics equipment. Consequently, it is expected to find new uses such as navigation and NFC (near field communications) which rely on position information obtained from ranging. This adds a new value to radio communication. The future radio equipment for high-speed data transmission should desirably be provided also with the ranging function.

As mentioned above, ranging is usually accomplished by measuring the time taken from packet transmission to packet reception. Keeping this time fixed is inconvenient to the system whose processing varies depending on the length and kind of packets. Moreover, adding special information for ranging to packets is not desirable in view of the effective use of band width.

Patent literature 1:
  Japanese Patent Laid-open No. 257545/1998

Patent literature 2:
  Japanese Patent Laid-open No. 119145/1993

Patent literature 3:
  Japanese Patent Laid-open No. 62334/1996

Non-patent literature 1:
  http://www.rosum.com

Non-patent literature 2:
  Nikkei Electronics, Mar. 11, 2002, p. 55-66 "Ultra Wideband: Revolutionary Wireless Technology is born"

OBJECT AND SUMMARY OF THE INVENTION

It is an object of the present invention to provide an improved ranging and positioning system, an improved ranging and positioning method, and an improved communication apparatus, which are so designed as to adequately measure the relative distance between two objects by means of radio waves.

It is another object of the present invention to provide an improved ranging and positioning system, an improved ranging and positioning method, and an improved communication apparatus, which are so designed as to adequately perform ranging and positioning between two radio sets which transmit and receive packets to and form each other.

It is further another object of the present invention to provide an improved ranging and positioning system, an improved ranging and positioning method, and an improved communication apparatus, which are so designed as to perform ranging and positioning by means of the procedure for transmission and response of packets between a sender and a recipient.

It is further another object of the present invention to provide an improved ranging and positioning system, an improved ranging and positioning method, and an improved communication apparatus, which are so designed as to perform ranging and positioning between two radio sets which transmit and receive packets to and form each other, without the necessity of fixing the time taken by the radio set from reception of packet to return of packets and also without the necessity of adding special information for ranging to packets.

BRIEF DESCRIPTION OF THE DRAWINGS

FIG. 7 is a diagram illustrating how the route of multi-hop transmission is determined according to the relative positions of radio sets.

DESCRIPTION OF THE PREFERRED EMBODIMENTS

Figure 1:
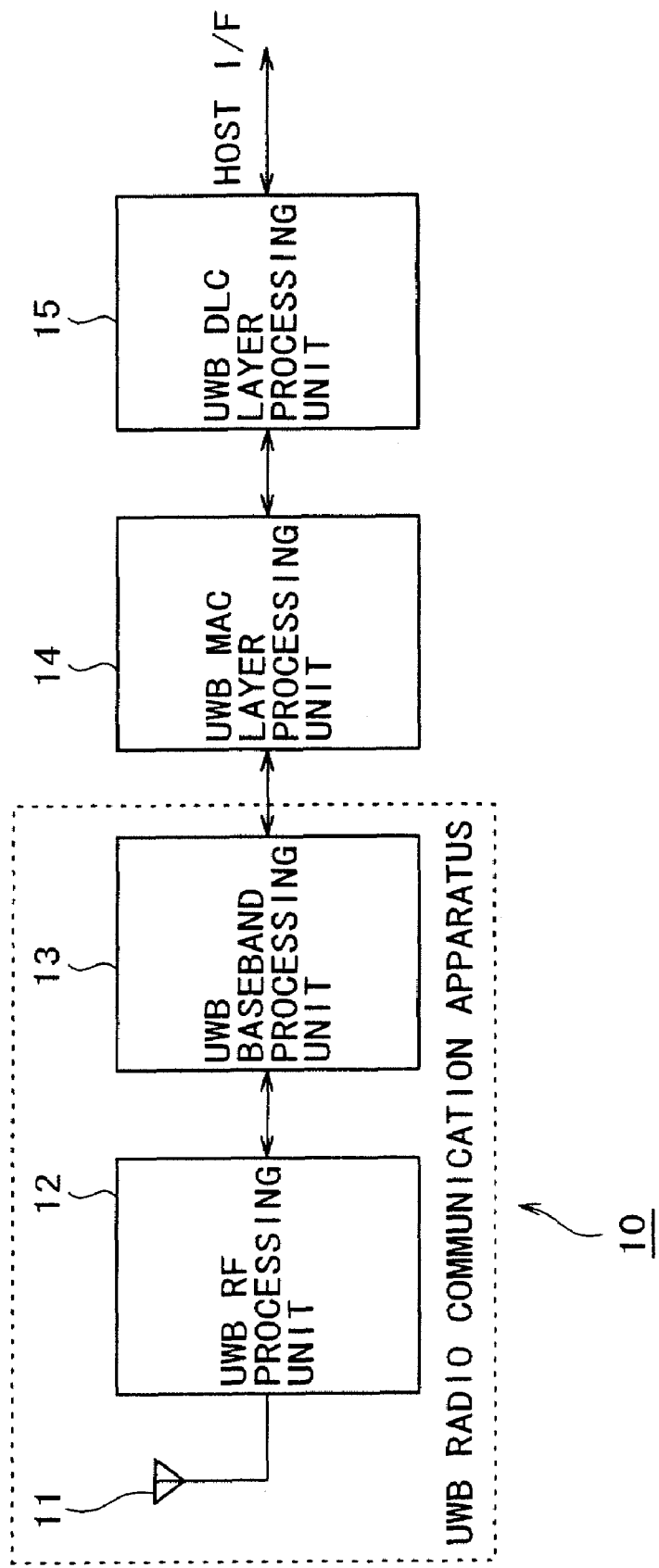
FIG. 1 is a schematic diagram showing the construction of the UWB radio communication apparatus 10 to which the present invention can be applied.

The present invention was completed to address the above-mentioned problems. The gist of the present invention resides in a ranging and positioning system to measure a distance between two radio sets which send and receive packets to and from each other and to determine a relative position of such two radio sets, said system being characterized in that the sending radio set transmits packets, the receiving radio set receives the packets and then sends them back after a certain length of time corresponding to an integral multiple of a prescribed unit time, and the sending radio set calculates the time required for packets to go and come back by subtracting the integral multiple of a prescribed unit time from the time taken from transmission of packets to reception of packets, thereby determining the distance between the sending and receiving radio sets according to the time required for packets to go and come back.

The term "system" implies a logical collection of a plurality of devices (or functional modules to carry out specific functions), which may or may not be housed in a single casing.

The ranging and positioning system of the present invention performs ranging each time two radio sets transmitting and receiving packets to and from each other exchange information.

The system is designed such that the sending radio set transmits packets to the receiving radio set and the receiving radio set receives the packets. After that, the receiving radio set returns the packets without fail after the lapse of time equal to an integral multiple of a prescribed unit time.

An advantage of the present invention is the ability to perform ranging in the following manner. The sending radio set detects packets only in the neighborhood of the moment at which packets are returned from the receiving radio set after it has transmitted packets. By using its counter, the sending radio set measures the time taken from transmission of packets from it to detection of packets by the receiving radio set. Thus, the time taken by the receiving radio set from packet detection to packet return is determined. The thus determined time and the processing time of the sending radio set are subtracted from the measured time, and the remainder is converted into the distance over which packets are transmitted to the receiving radio set.

Another advantage of the present invention is the ability to adequately perform ranging and positioning between two ratio sets which transmit and receive packets to and from each other, without the necessity of fixing the time required for the radio set to receive and return packets and without the necessity of adding special information for ranging to packets.

Another advantage of the present invention is the ability to perform ranging between radio sets each time information is transmitted and to renew the ranging information time to time.

Some errors may occur in packet detection depending on signal intensity and propagation characteristics, and erroneous detection may lead to incorrect ranging. This problem may be avoided if the radio set performs ranging only when data is reliable.

The ranging and positioning system of the present invention permits the radio set to control itself based on the ranging information. For example, if the sending power is properly controlled according to the distance to the partner radio set for packet communication, then it is possible to reduce interference with other radio sets.

The advantage of the ranging and positioning system of the present invention is the ability to control or limit the function of a radio set or a machine provided with a radio set based on the result of ranging.

For example, the ranging and positioning system may be used to start a certain processing only when the user of the radio set approaches a specific machine (or the distance reaches a certain value). Alternatively, the result of ranging may be used to register the user's initial code when a machine for NFC is purchased or when a machine that requires a high level of securing is purchased, if such a machine is close (within 50 cm) to the radio set. In this case, the range for communication may be restricted by reducing the sending power or by intentionally increasing the transmission rate.

The ranging and positioning system of the present invention permits one radio set to acquire through communication a list and ranging information possessed by its neighboring radio sets, thereby finding the relative positions of its neighboring radio sets.

If there exist one radio set and two radio sets nearby, the first one attempts to acquire the list and position information possessed by at least either of the second and third ones. The first radio set compares the thus acquired list and position information with its own, so as to uniquely define a triangle whose vertexes correspond to the positions of the three radio sets. In this way the first radio set is able to know its position relative to its neighboring radio sets or to know the relative positions of the nearby two radio sets.

The ranging and positioning system of the present invention permits one radio set to combine the sketch and map information with the position information possessed by two or more stationary radio sets, thereby mapping the positions of individual radio sets.

According to the ranging and positioning system of the present invention, the sending radio set carries out communications twice with the receiving radio set by allowing the latter to change the time required for it to return packets. By using the result of two measurements, the sending radio set can cancel errors due to insufficient accuracy of time measurement in the receiving radio set.

If two or more radio sets are arranged such that their antennas are a certain distance apart, then one of them can compare the measured distance with the known distance, thereby correcting the difference between the nominal and actual values of time elapsing from packet detection to packet transmission, or correcting the error of its own oscillator.

These and other objects and advantages of the invention may be readily ascertained by referring to the following description and appended drawings.

The radio communication system of the present invention is based on the UWB transmission system (mentioned above) that performs radio communication by means of a train of very weak impulses to carry information. By using the high time resolution resulting from ultrafine pulses, this system is able to measure the distance between two radio sets each time information is transmitted.

FIG. 1 is a schematic diagram showing the construction of the UWB radio communication apparatus 10 to which the present invention can be applied. As shown in this figure, the UWB radio communication apparatus 10 consists of a UWB antenna 11 to transmit and receive impulse signals, a UWB RF processing unit 12 to modulate and demodulate transmission signals, a UWB base band processing unit 13 to perform modulation-demodulation of base band signals, synchronization, propagation path measurement, and ranging, a UWB MAC (Media Access Control) layer processing unit 14 to perform access control and adaptive control of transmission rate, and a UWB DLC (Data Link Control) layer processing unit 15 to perform adjacent node control, encryption, and authentication management. The first three units (11, 12, and 13) correspond to the UWB physical layer.

Figure 2:
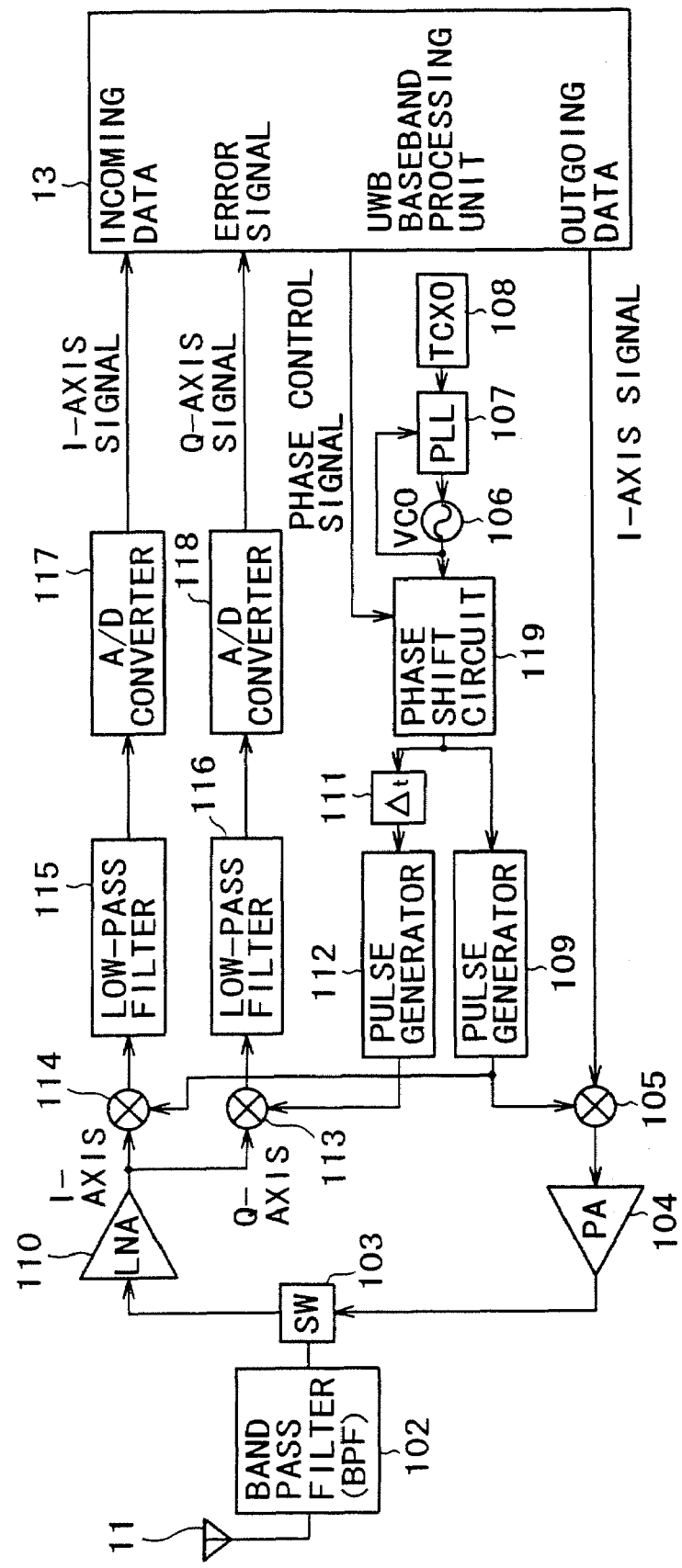
FIG. 2 is a detailed diagram showing the construction of the UWB RF processing unit 12.
Figure 3:
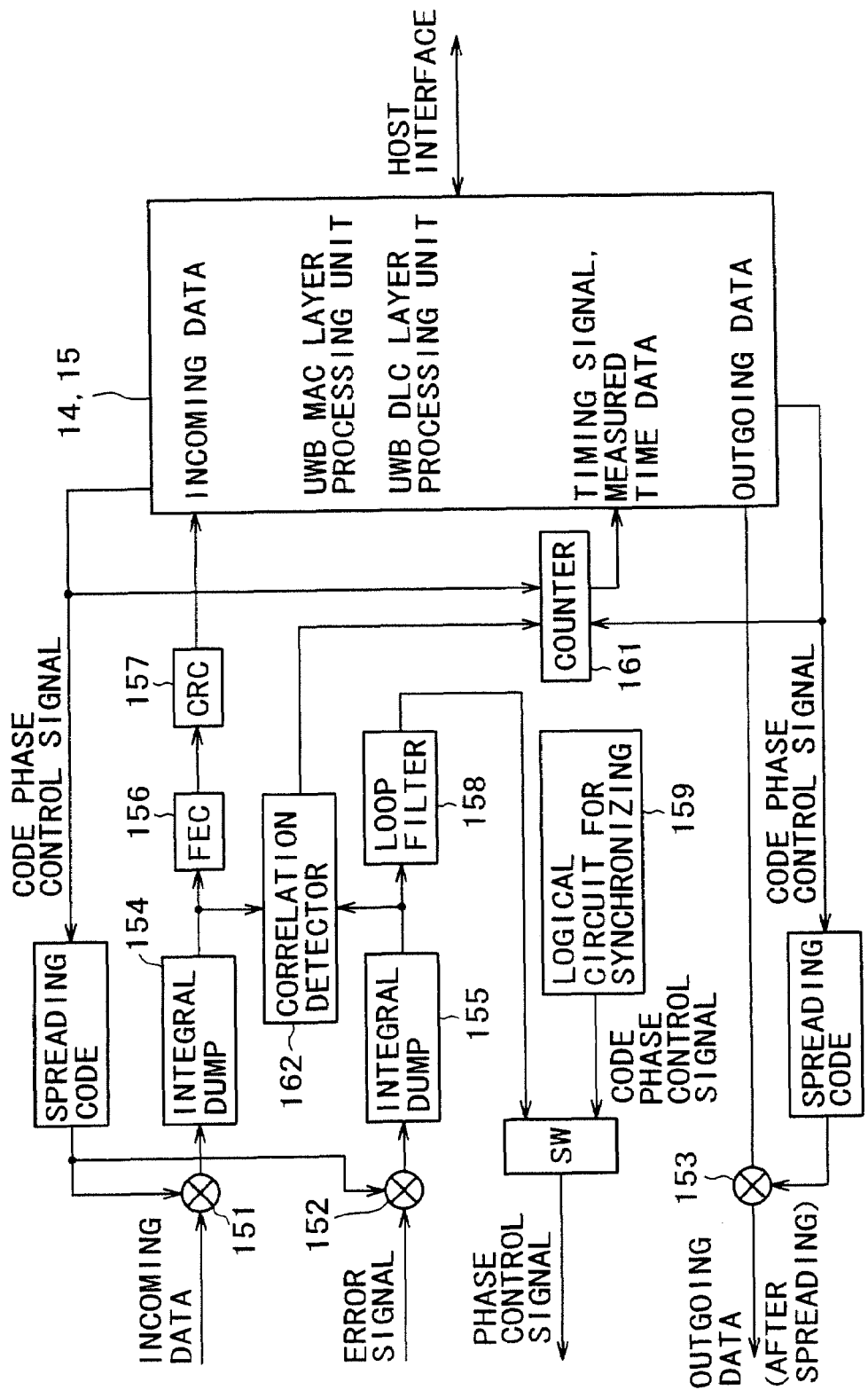
FIG. 3 is a detailed diagram showing the construction of the UWB base band processing unit 13.

FIG. 2 is a diagram showing in more detail the internal construction of the UWB RF processing unit 12. FIG. 3 is a diagram showing in more detail the internal construction of the UWB base band processing unit 13. The illustrated one employs the BPSK (Binary Phase Shift Keying) modulation system so that it uses only I-axis to carry transmission data.

The transmitting operation proceeds as follows. In the base band circuit 13, transmission data is multiplied (for modulation) by the spreading code to give spread transmission data by means of the multiplier 153. The crystal oscillator (TCXO) 108 generates an oscillator frequency to be multiplied by means of PLL 107 and VCO 106 to give a higher oscillatory frequency, from which the pulse generator 109 generates pulse signals. The multiplier 105 multiplies (for modulation) the PN-spread transmission signal by the pulse signal having a prescribed pulse width, thereby giving a train of impulse signals. The power amplifier (PA) 104 amplifies the transmission signal in the form of a train of impulse signals. The bandpass filter (BPF) 102 allows passage of only signal components with a frequency meeting the regulation of FCC. Finally, the antenna 101 sends signals into the transmission line.

On the other hand, the receiving operation proceeds as follows. The antenna 101 receives signals. The bandpass filter 102 removes signal components other than transmission pulse signals from the received signals. The low-noise amplifier 110 amplifies the signals which have passed through the bandpass filter 102. The crystal oscillator TCXO) 108 generates an oscillator frequency to be multiplied by means of PLL 107 and VCO 106 to give the same frequency as that for transmission. From this frequency, the pulse generator 109 produces template pulses and the pulse generator 112 produces template pulses with their phase shifted by 90 deg by the orthogonal modulator 111. The multipliers 113 and 114 respectively multiply the template pulses by the received signals, thereby giving detection signals of I-axis and Q-axis. The low-pass filters (LPF) 113 and 114 remove high-frequency components from the detection signals. The A/D converters 117 and 118 convert the filtered signals into digital signals at the pulse peak. The converted digital signals are processed in the UWB base band processing unit 13.

Operation in the UWB base band processing unit 13 proceeds as follows. The multipliers 151 and 152 multiply the detection signals of I-axis and Q-axis by the spreading code, thereby accomplishing inverse spreading. The integration dumps 154 and 155 integrate the inverse spread signals. The I-axis signals undergo FEC (Forward Error Correction) 156 and CRC (cyclic redundancy Check Code) 157, and the reception signals are isolated. The Q-axis signals are fed back to the clock generator through the loop filter 158. The clock generator adjusts the clock generating timing according to the integrated output.

The UWB base band processing unit 13 in this embodiment has the ranging function to measure the distance between one radio set and the other each time information transmission is carried out. The actual ranging operation proceeds as follows. The sending radio set transmits packets to the receiving radio set (as the opposite partner) according to the ordinary communication sequence. Upon detection of the packets, the receiving radio set returns them after a certain length of time corresponding to an integral multiple of a prescribed unit time. The sending radio set detects the packets in the neighborhood of the moment at which the return of packets is expected. By using the counter 161, the sending radio set measures the time taken from the transmission of packets to the detection of returned packets, thereby determining the time taken by the receiving radio set from the detection of packets to the return of packets. The thus determined time and the processing time required by the sending radio set are subtracted from the measured time, and the resulting remainder is finally converted into the distance.

The packet detecting process takes place as follows. The correlation detector 162 detects the correlation between the spreading code and the integration dump 154 for the received data. The counter 161 counts the position at which the correlation value is maximum and larger than a prescribed one. Because the spreading code has been multiplied before the correlation detector 162, the correlation detector 162 is able to examine the presence or absence of correlation with the spreading code according to the outputs of the I-axis and Q-axis. In both the sending and receiving sides, the control signals for spreading code enter the counter 161, so that the counter 161 is able to count the length of time from the start of spreading signals in the sending side to the synchronization of spread signals in the receiving side.

Incidentally, in this embodiment, synchronization is achieved by means of the phase shifter 119 which shifts the generating timing for sliding correlation. The method for sliding correlation is described in Japanese Patent Application No. 27541/20003 which has been assigned to the present applicant. The method for synchronization is not mentioned further herein because it does not relate direction to the scope of the present invention.

The radio communication system of the present invention is designed such that ranging is accomplished between two radio sets each time information is transmitted from one to the other. In ordinary communication sequence, a first radio set transmits packets to a second radio set (as the partner for communication), and upon receipt of such packets, the second radio set sends back them after a lapse of time corresponding to an integral multiple of unit time from the detection of such packets. The first radio set detects the packets in the neighborhood of the moment at which the packets are returned from the second radio set. Then, the first radio set measures (using the counter) the time which has elapsed from its transmission of packets to the detection of packets by the second radio set. In this way the first radio set determines the time which has elapsed from the detection of packets by the second radio set to the transmission of packets by the second radio set. The thus determined time and the time taken by the first radio set for processing are subtracted from the measured time. The remainder is converted into the distance of propagation to the second radio set (as the partner). In this way ranging is accomplished.

According to the present invention, ranging between two radio sets is accomplished by transmission and reception of signals between them. The mechanism for ranging in this manner is explained by reference to FIG. 4.

The first radio set sends packet (1) to the second radio set and waits until the second radio set sends back packet (2). The first radio set measures, using its own counter 161, the time which has elapsed from the transmission of packet (1) to the detection of packet (2).

Upon receipt of packet (1) from the first radio set, the second radio set sends back packet (2) to the first radio set after a prescribed period of time (which is an integral multiple of unit time, mentioned later).

Figure 4:
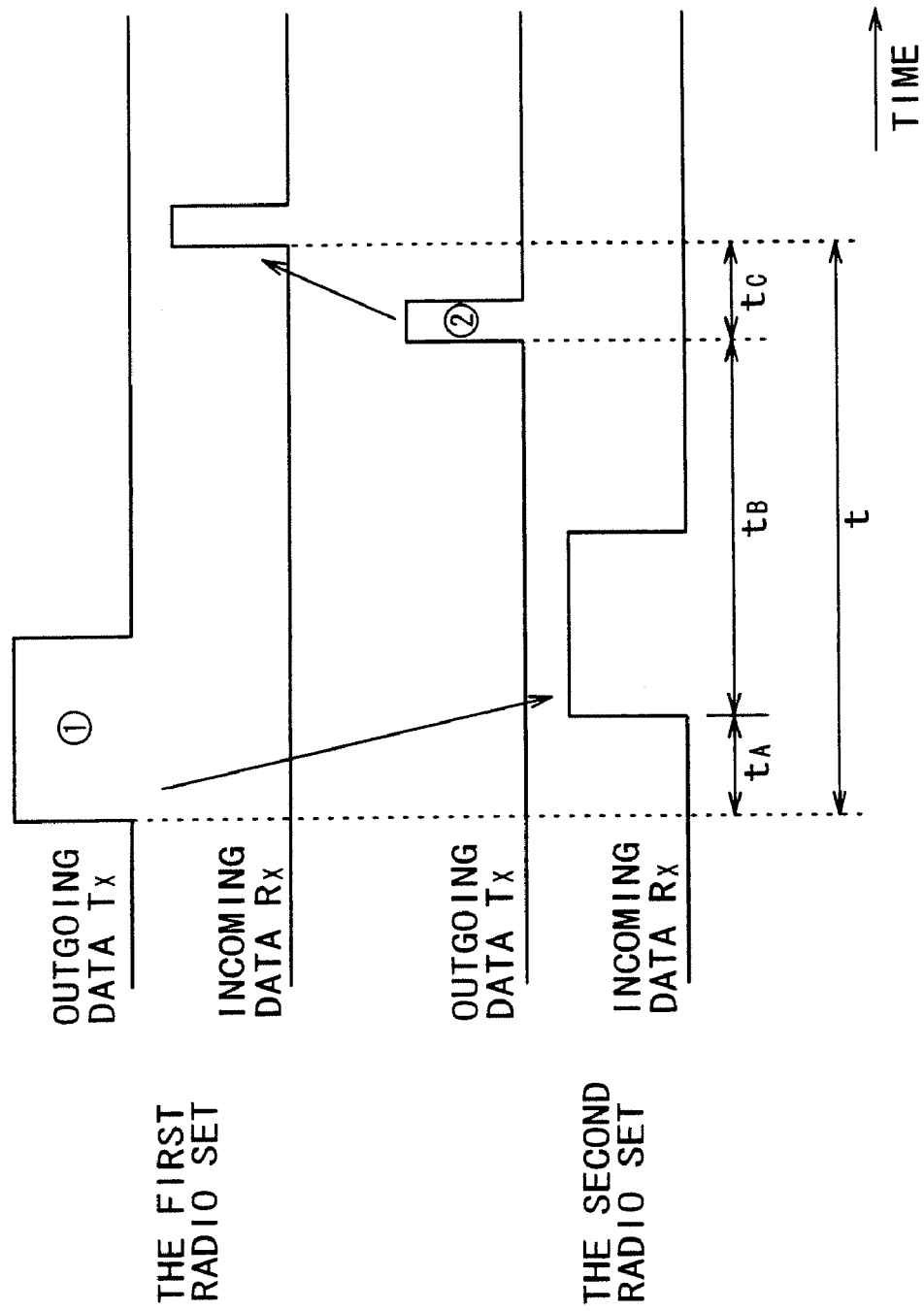
FIG. 4 is a diagram illustrating how two radio sets transmit and receive signals to and from each other to measure the distance between them.

The first radio set detects packet (2) which has been sent back and then calculates the distance between the first radio set and the second radio set from the counter value which has been read at the time of detection. The time recognized by the logic circuit is shown in FIG. 4.

t: true time that elapses from transmission of packet by the first radio set to detection of packet by the second radio set.

$T_A$: ($t_{AIR}$) time for propagation through space+($t_{DT1}$) delay time of RF transmitting circuit in the first radio set.

$t_B$: ($t_{D2}$) delay time of RF receiving circuit in the second radio set+($t_{P2}$) delay time in the second radio set+($t_{D2}$) delay time in RF transmit circuit in the second radio set.

$t_C$: ($t_{DT1}$) delay time in RF receiving circuit of the first radio set+($t_{P1}$) time for processing by the first radio set+($t_{AIR}$) time for propagation through space.

Usually, in the second radio set, the processing time required for signal detection is fixed and the delay time of the RF transmitting and receiving circuits is also fixed. According to the above-mentioned definition, t is expressed as follows.

$$t=t_A+t_B+t_C=2t_{AIR}+t_{D1}\,t_{D2}+t_{P1}+t_{P2}(t_{D1}=t_{DT1}\,t_{DR1}, \\ t_{D2}=t_{DT2}+t_{DR2}) \quad (1)$$

Also, the distance d between the two radio sets is represented as follows.

$$d=c \cdot t_{AIR} \text{ (c: velocity of light)} \quad (2)$$

Consequently, the first radio set can find the distance d between the two radio sets by counting time t and calculating $t_{AIR}$ from the equation given above. The ultra-wide band signal like UWB gives a high time resolution in the detection of received pulses or correlation. Thus, with a time resolution of one nanosecond, the radio communication system can realize a distance resolution of 30 cm.

The foregoing is the way in which the distance between two radio sets can be measured by communication between them. The processing time $t_{P2}$ of the second radio set constituting the radio network includes time intervals such as IFS (inter-frame spacing) and random delay time to reduce the probability of packet collision. In this case, the first radio set needs to know $t_{P2}$ or $t_B$ (which is not fixed) of the second radio set in some way (for example, by superimposing information relating to the processing time $t_{P2}$ on the packet which the second radio set sends back). However, superimposing special information on the packet for the purpose of ranging is not desirable from the stand-point of effective use of bandwidth.

In this embodiment, the second radio set works in such a way that its processing time ($t_{P2}$ or $t_B$), including IFS and random delay time, is always an integral multiple of a specific unit time (for example, 100 ns×N), provided that N is an integer but its value is undefined. In this case, the first radio set transmits packets and then repeats the processing for detecting packets in the neighborhood of the moment at which packets would be returned after an integral multiple of a unit time. The processing for detecting packets is designed to detect correlation with the spreading code, and the position at which the value of correlation is maximum and greater than a specified value is regarded as the result of measurement.

If the second radio set has the processing time ($t_{P2}$ or $t_B$) which is an integral multiple of 100 ns as the unit time, then the distance over which signals are transmitted within the unit time is 30 m (=c×100 ns). In other words, an integral multiple of 30 m remains undefined in the processing of packet detection, because N has an undefined value and what is simply agreed upon is that packets are returned with a delay time corresponding to N-multiple of the unit time. This uncertainty, however, is not a problem in the ordinary transmission at a velocity of light which is limited in the distance for practical communication. That is, a communication system capable of transmission within a distance of 30 m poses no problems so long as the distance to be measured is limited to 30 m or less.

Thus, the first radio set is able to find the distance between it and the second radio set from the remainder of division by 30 m of the distance obtained from equation (2). This is equivalent to calculating equation (2) after subtracting t from 100 ns×N, with N specified beforehand.

Figure 5:
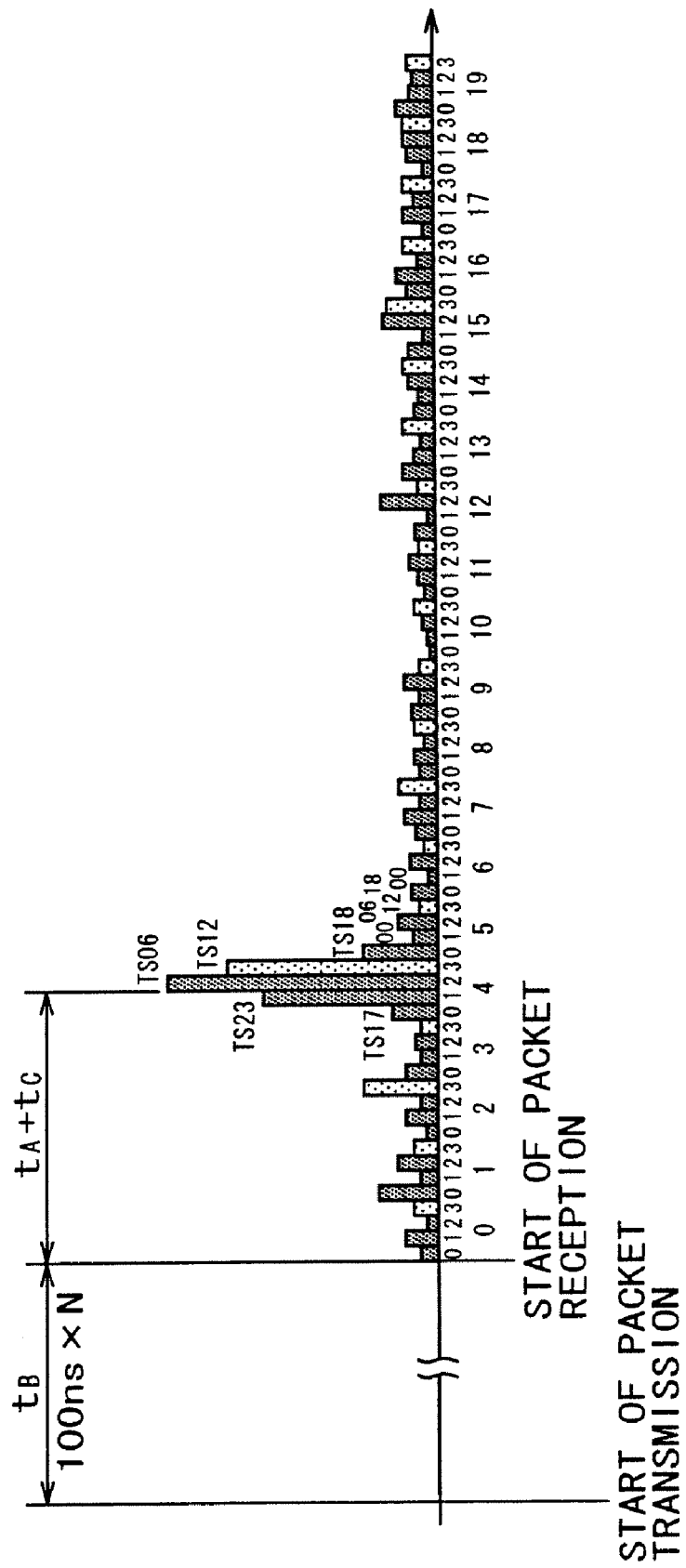
FIG. 5 is a diagram illustrating how to detect packets by establishing relationship with the spreading code.

FIG. 5 shows how the processing for packet detection is accomplished by correlation with the spreading code. The first radio set sends packets and then starts the processing for receiving returned packets after the lapse of $t_{P2}$ or $t_B$ (=100 ns×N), which is the processing time of the second radio set.

(The elapsed time corresponding to an integral multiple of 100 ns after the transmission of packets is ignored.) Subsequently, the first radio set detects correlation between the received signal and the spreading code. After a period of $t_4+t_C$ has passed, the correlation peak position is detected at which the correlation value is maximum and larger than a specified value. This is the result of measurement.

This embodiment is intended to effectively utilize the processing time $t_{P2}$ (or $t_B$) of the second radio set which is usually regarded as unnecessary in packet exchange. The advantage is that ranging and positioning can be accomplished between two radio sets which send and receive packets, without the necessity of fixing the time required for the radio set to receive and return packets and without the necessity of adding special information for ranging to packets.

The advantage of the ranging system mentioned above is that the first radio set which is to perform ranging only needs to know the interval of unit time (100 ns in the above-mentioned example) which is previously agreed upon in the radio communication system and it does not need to know directly the information about $t_{P2}$ from the second radio set. Moreover, the first radio set carries out ranging each time it sends and receives packets to and from the second radio set. In this way the ranging information can be renewed time to time. This system is effective for navigation with a mobile radio set and for control of an autonomous robot.

Detection of packets may possibly be erroneous depending on the signal intensity and the propagation characteristics, and erroneous detection results in incorrect ranging. This may be avoided if the radio set performs ranging only when data is reliable.

To be concrete, it is possible to prevent incorrect ranging by calculating the distance after the validity of detected packets has been confirmed or by utilizing the calculated distance. This object is achieved not only by using the result of detection of correlation but also by comparison with the intensity of detected signals which depends on the distance from one radio set to the other. The object is also achieved by checking CRC in the processing unit 14 of the UWB MAC layer of the radio set which is constructed as shown in FIG. 1.

In the ordinary radio communication, ranging information is not always necessary at each time of communication. Therefore, the UWB radio set shown in FIG. 1 may be constructed as follows. The functional modules, including the RF processing unit 12 and the base band processing unit 13, are so designed as to renew ranging data at all times although the section for packet detection has the possibility of incorrect detection. The processing unit 14 of the MAC layer and the processing unit 15 of the DLC layer are so designed as to read the result of measurement for ranging only when necessary.

The ranging information obtained in this manner can be used for control of the radio set itself. For example, controlling the sending power according to the distance to the partner with which packet communication is being carried out is effective in reducing interference with nearby radio sets.

In addition, the ranging information may be used to start specific processing only when the user of the radio set gets closer to a target machine than a predetermined distance. After noticing that the user's radio set has got closer than 50 cm (for example) to a target machine (for NFC or high security), the user may use this ranging information to register the user's initial code with it. In such a case, the user may restrict the coverage by intentionally raising the transmission rate instead of lowering sending power.

The present invention may be applied to a wireless network, in which case each radio set recognizes its neighboring ones by receiving beacons from them. Moreover, each radio set keeps in its memory a list of the radio sets from which it has received beacons. In such a wireless network, not only do the radio sets receive beacons but also they exchange packets with one another, thereby performing ranging. Thus, each radio set in the wireless network recognizes its neighboring radio sets and also remembers the distance to the recognized radio sets. Moreover, it renews the ranging information each time it measures the distance to its neighboring radio sets.

Information alone about the distance between one radio set and its neighboring radio sets is not enough to reveal their relative positions. However, this object is achieved if one radio set acquires through communication the list and ranging information possessed by its neighboring radio sets.

For example, suppose that there exist one radio set and two radio sets in its neighborhood. The first radio set acquires the list and ranging information from at least one of its neighboring radio sets. It compares the thus acquired list and information with its own; this univocally gives a triangle whose vertexes correspond respectively to the positions of the three radio sets. Such a triangle reveals the relative positions of the neighboring radio sets, and the thus acquired list and ranging information enhance the reliability of information about the relative positions of radio sets involved.

Figure 6:
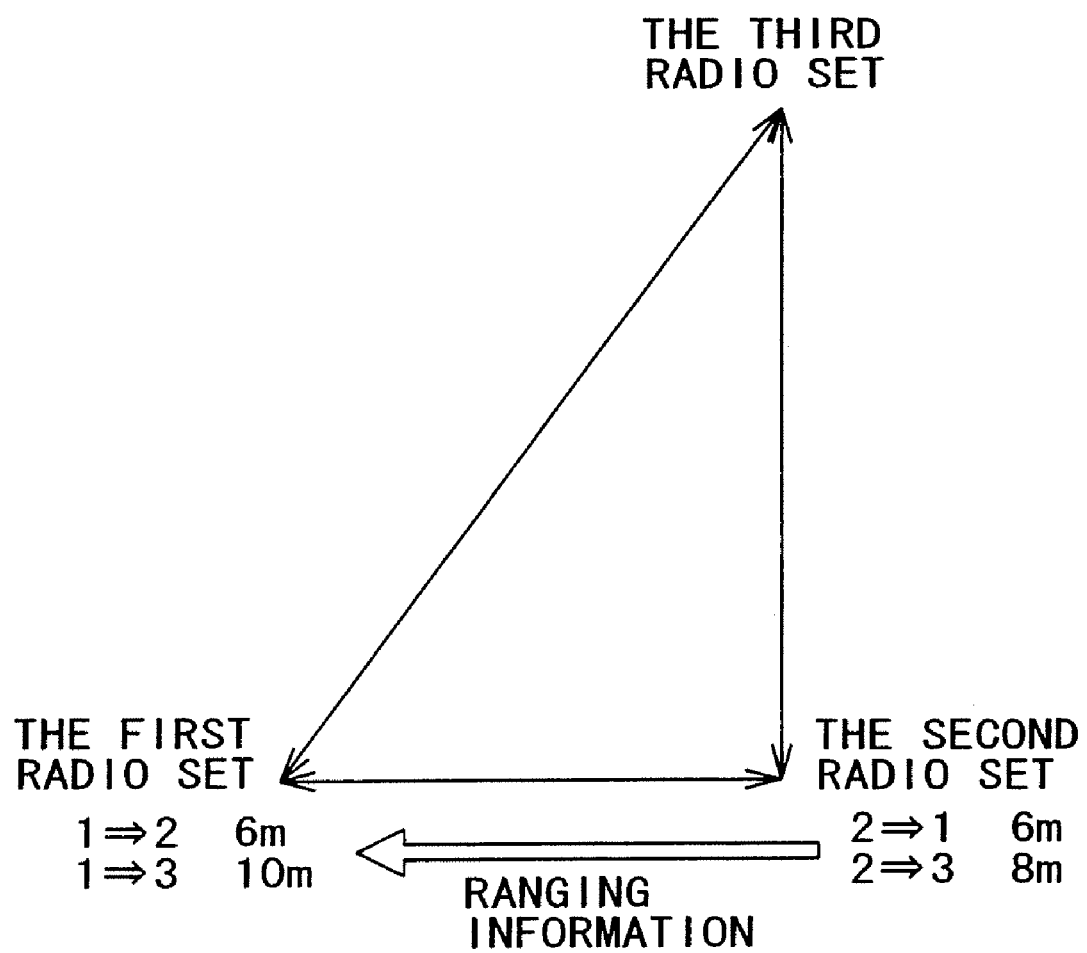
FIG. 6 is a diagram illustrating how one radio set acquires a list of radio sets and ranging information from its neighboring radio sets and then compares them with those which it already possesses, thereby finding the relative position of its neighboring radio sets.

FIG. 6 shows the procedure by which the first radio set acquires the list and ranging information from its neighboring radio sets, compares them with its own, and knows its position relative to its neighboring radio sets. In FIG. 6, it is assumed that the three radio sets are sufficiently close to one another for their communication. It is also assumed that the first radio set possesses the list and ranging information indicating that it is 6 m and 10 m away from the second and third radio sets, respectively. It is also assumed that the second radio set possesses the list and ranging information indicating that it is 6 m and 8 m away from the first and third radio sets, respectively. Now, the first radio set acquires the list and ranging information from the second radio set and compares them with its own. Thus, there is univocally obtained a triangle whose vertexes correspond to the positions of the three radio sets as shown. In this way the relative positions of the three radio sets are revealed.

The foregoing procedure can be applied to a situation in which there exist four or more radio sets, if the triangle is combined with additional ones.

The information thus obtained about the relative position of the radio sets can be used to establish the route for multi-hopping transmission from one radio set to the other when direct contact between them is not available.

FIG. 7 shows how to establish the route for multi-hopping by using the information about the relative positions of the radio sets. In this illustration, it is assumed that one wants to send signals from the third radio set to the fourth radio set but their positions do not permit direct contact between them. So, the third radio set acquires the list of radio sets and the ranging information from its neighboring radio sets, and eventually it knows that the fourth radio set (which is its recipient) exists in the range within which the fifth radio set is capable of communication. In this way, it is possible to establish the route for multi-hopping transmission from the third radio set to the fourth radio set through the fifth radio set.

There are some immobile machines equipped with a radio set, such as large TV and stereo sets and desktop personal computers. The radio set in such machines may be given a piece of information stating that its position is fixed, so that it provides the relative positions with respect to its fixed position.

For example, it is assumed in FIG. 6 that the second and third radio sets are fixed and that the first radio set has acquired not only the list of radio sets and the ranging information but also the information about whether or not individual radio sets are fixed. Now, if the positions of the second and third radio sets are assigned respectively to the origin (0,0,0) and the point (0, 8 m, 0) of the X-Y coordinate, then their positions can be represented on the coordinate in which the Y-axis is the straight line connecting the second and third radio sets.

The advantage of the ranging and positioning system of the present invention is its ability to acquire from outside the information about the map and sketch of the space in which there exist three or more radio sets or three or more machines each having a radio set. By combining this information with the position information of the stationary radio set, each radio set finds the positions of itself and its neighboring radio sets and adds them to the map and sketch showing the positions of the radio sets. This procedure can be applied to a system to recognize positions in a room.

As mentioned above, ranging by means of transmission and reception of packets between radio sets adds a new value to the radio communication system. Unfortunately, the equations (1) and (2) as the basis for ranging do not take into account errors due to accuracy of clock frequencies dependent on the oscillator mounted in the radio set.

Errors due to clock accuracy creep in the processing time of the first and second radio sets which perform packet transmission and reception as shown in FIG. 4. Such errors can be minimized in the following manner. It is assumed that the nominal value of the processing time $t_{P1}$ and $t_{P2}$ is $t_{P1}'$ and $t_{P2}'$, respectively, and that the error (ratio) of the clock of the first and second radio sets is $\epsilon_1$ and $\epsilon_2$, respectively. The nominal value of the processing time is the accurate clock number required for processing which is expressed in terms of the nominal value of clock frequency. For example, $|\epsilon|<10\times10^{-6}$ if the TCXO (temperature compensated crystal oscillator) has an error less than 10 ppm. According to this definition, the true time t required for the first radio set to transmit packets and the second radio set to detect them is represented by the equation (3) below.

$$t=2t_{AIR}+t_{D1}+t_{D2}+t_{P1}'(1+\epsilon_1)+t_{P2}'(1+\epsilon_2) \quad (3)$$

The first radio set counts the true time t by using its own clock. This counting gives the time $t_{CNT}$, which leads to $t=t_{CNT}\cdot(1+\epsilon_1)$, in which no account is given to quantum errors due to the resolving power of the clock. Thus, the distance d between the first and second radio sets is represented by the equation (4) below.

$$d=c\cdot t_{AIR}=\{(t_{CNT}-t_{P1}')(1+\epsilon_1)-t_{P2}'(1+\epsilon_2)-(t_{D1}+t_{D2})\}c/2 \quad (4)$$

The actual calculations of distance make an error $\Delta d$, as represented by the equation (5) below, in regard to the accurate distance, if calculations simply omit the delay time ($t_{D1}$ and $t_{D2}$) of the RF transmitting and receiving circuits and the errors ($\epsilon_1$ and $\epsilon_2$) of the clock (or assuming that $\epsilon_1$, $\epsilon_2=0$).

$$\Delta d=\{(t_{CNT}-t_{P1}')\epsilon_1-t_{P2}'\epsilon_2-(t_{D1}+t_{D2})\}c/2 \quad (5)$$

Thus, calculations in the simplest way produce errors, as represented by the equation (5), resulting from the delay time of the RF transmitting and receiving circuits and the accuracy of the clock. Errors due to the delay time are of the magnitude of resolving power at the most, and the nominal value of $t_{P1}'$ is sufficiently small. Therefore, the nominal value $t_{P2}'$ is affected predominantly by the clock accuracy.

For example, if it is assumed that $t_{P2}'$ is 100 μs and $\epsilon_1$ and $\epsilon_2$ each are 10 ppm, the equation (5) above indicates that the maximum error is about 30 cm. In other words, if $t_{P2}'$ is small, the result of ranging is sufficiently accurate; however, errors grow in proportion to $t_{P2}'$.

It is to be noted that in the foregoing description the equation (5) assumes that the nominal values ($t_{P1}'$ and $t_{P2}'$) of the processing time of the first and second radio sets are correct. If these nominal values are erroneous (on account of the designer's incorrect estimate of clock number), serious errors will result. For example, if $t_{P2}'$ has an error of 10 ns (which corresponds to one clock cycle in the case of a 100-MHz clock), an error of about 3 m will occur in distance measurement. However, if the minimum unit of counting error is 10 nm, the error in distance measurement will be a multiple of 3 m and hence it would be possible to make corrections by judging from the signal intensity or S/N at the time of reception.

It is also possible to reduce ranging errors by repeating twice the transmission and reception of packets. If the processing time ($t_{P2}'$) in the second radio set is intentionally changed and $t_{CNT}$ is measured twice, it is possible to reduce the error ($\Delta d$) given by the equation (5) above, thereby improving the accuracy of ranging.

For example, it is assumed that the first and second radio sets perform packet transmission and reception twice consecutively as shown in FIG. 4. In this case, the processing time ($t_{P2}'$) in the second radio set is intentionally changed for the first and second operations. If $t_{P2}'$ for the second operation is $t_{P2}'$ (for the first operation) multiplied by k (k=positive real number), the first and second measurements of time ($t_{CNT1}$, $t_{CNT2}$) taken by the first radio set are represented respectively by the equations (6-1, 6-2) below.

$$t_{CNT1}=\{2t_{AIR}+t_{D1}+t_{D2}+t_{P1}'(1+\epsilon_2)+t_{P2}'(1+\epsilon_2)\}/(1+\epsilon_1) \quad (6-1)$$

$$t_{CNT2}=\{2t_{AIR}+t_{D1}+t_{D2}+t_{P1}'(1+\epsilon_1)+kt_{P2}'(1+\epsilon_2)\}/(1+\epsilon_1) \quad (6-2)$$

Elimination of $t_{P2}'$ from the two equations above gives the distance d between the two radio sets as represented by the equation (7) below.

$$d=c\cdot t_{AIR}=[\{(kt_{CNT1}-t_{CNT2})/(k-1)-t_{P1}'\}(1+\epsilon_1)-(t_{D1}+t_{D2})]c/2 \quad (7)$$

The foregoing method eliminates errors due to the clock accuracy of the second radio set, thereby improving the ranging accuracy, as is apparent from the equation (7). This effect is significant when the first radio set has a high degree of clock accuracy. This discussion is valid only when k has no errors (or incorrect clock counting). If k has an error as represented by k(1+$\epsilon_1$), then the measured distance will have an error $\Delta d$ as shown in the equation (8) below.

$$\Delta d=\epsilon_k t_{P2}'(1+\epsilon_1)c/2\approx\epsilon_k t_{P2}'c/2 \quad (8)$$

In ranging operation, any deviation from the nominal values ($t_{P1}'$ and $t_{P2}'$) due to incorrect clock counting leads directly to the ranging errors, which would exceed the accuracy of the clock frequency. Therefore, $t_{P1}'$ and $t_{P2}'$ should be accurate.

Any error in $t_{P2}'$ can be known and corrected in the following manner. First, get ready a reference radio set which is free of errors in $t_{P2}'$ and has a highly accurate clock frequency. Designate this reference radio set as the first radio set. Place the first and second radio sets exactly 1 m apart. Carry out ranging, and calculate the distance d from the equations (1) and (2) above. Double the difference between d and 1 m (true distance), and divide the result by c (velocity of light). If the procedure for correction mentioned above is accomplished in the mass-production step and the correcting value thus obtained is recorded in the memory, it is possible to solve the problem of the processing time ($t_{P2}'$) deviating from the nominal value.

If it is sure that the processing time ($t_{P2}'$) does not deviate from the nominal value, the clock of the reference radio set should be kept highly accurate (such that $\epsilon_1$ is much smaller than $\epsilon_2$), so that the difference between the distance d (calculated from the equations (1) and (2) above) and the true distance (1 m) is equal to $\Delta d$. In this way it is possible to calculate the error ($\epsilon_2$) of the clock frequency of the second radio set from the equation (5) above. The result of calculations may be stored for correction.

While the described embodiment represents the preferred form of the present invention, it is to be understood that modifications will occur to those skilled in the art without departing from the spirit of the invention. The scope of the invention is therefore to be determined solely by the appended claims.

EFFECT OF THE INVENTION

As mentioned above, the present invention provides an improved ranging and positioning system, an improved ranging and positioning method, and an improved radio communication apparatus, which can be adequately used to measure the relative distance between objects by using radio waves.

The present invention provides an improved ranging and positioning system, an improved ranging and positioning method, and an improved communication apparatus, which are so designed as to adequately perform ranging and positioning between two radio sets which transmit and receive packets to and form each other.

The present invention provide an improved ranging and positioning system, an improved ranging and positioning method, and an improved communication apparatus, which are so designed as to perform ranging and positioning between two radio sets which transmit and receive packets to and form each other, without the necessity of fixing the time taken by the radio set from reception of packet to return of packets and also without the necessity of adding special information for ranging to packets.

The radio communication system according to the present invention permits ranging between radio sets to be performed each time information is transmitted and hence permits the ranging information to be renewed time to time.

The system of the present invention may also be applied to a flexible wireless network in which the time required for the partner radio set to detect packets and return packets is not fixed. This makes it possible to perform ranging without the necessity of receiving the time information of the partner radio set.

The system of the present invention may also be used to control radio sets or wireless networks or to limit the function of machines equipped with a radio set, by using the information obtained from ranging.

The present invention may also be applied to the position recognition system which uses the position information of radio sets which is renewed time to time.

What is claimed is:

1. A radio communication apparatus for ranging and positioning by packet transmission and reception, comprising:
   a transmission unit configured to transmit packets;
   a detection unit configured to detect returned packets after a lapse of time that follows packet transmission, the lapse of time being equivalent to an integral multiple of a prescribed unit time;
   a measuring unit configured to measure time that has elapsed from transmission of packet to detection of returned packets by subtracting the integral multiple from the elapsed time;
   a calculation unit configured to calculate the distance to the recipient of packets from the thus measured time; and
   a control unit configured to control the sending power of the radio communication apparatus on the basis of the result of the calculation unit.

2. The radio communication apparatus as defined in claim 1 wherein the control unit controls or limits a specific function on the basis of the result of the calculation unit.

3. The radio communication apparatus as defined in claim 1, further comprising:
   a communication unit configured to perform communication for a specific function relating to security only when the relative distance is less than a prescribed value on the basis of the result of the calculating unit.

4. The radio communication apparatus as defined in claim 1, wherein the control unit includes a power control unit configured to reduce the sending power and/or increasing the transmission rate according to the result of the calculation unit, thereby intentionally making reception difficult for radio sets excluding a specific recipient.

5. The radio communication apparatus as defined in claim 1, further comprising:
   a storage unit configured to store a list of neighboring radio sets and data of distance between the radio communication apparatus and the neighboring radio sets.

6. The radio communication apparatus as defined in claim 5, further comprising:
   an acquisition unit configured to acquire ranging information possessed by other radio sets; and
   a position derivation unit configured to derive the position of the radio communication apparatus relative to the neighboring radio sets from the acquired ranging information and the raging information of the radio communication apparatus.

7. The radio communication apparatus as defined in claim 5, wherein each radio set position is derived from information pertaining to stationary radio sets.

8. The radio communication apparatus as defined in claim 7, wherein each radio set position is derived from a combination of position information of three or more stationary radio sets with other map position information to map the position of the radio communication apparatus or the position of other radio sets on the basis of the position information of other two or more radio sets.

9. A method of ranging and positioning through packet transmission and reception of a radio communication apparatus, comprising:
   transmitting packets;
   detecting returned packets after a lapse of time that follows packet transmission, the lapse of time being equivalent to an integral multiple of a prescribed unit time;
   measuring time that has elapsed from transmission of packet to detection of returned packets by subtracting the integral multiple from the elapsed time;
   calculating the distance to the recipient of packets from the thus measured time; and
   controlling the sending power of the radio communication apparatus on the basis of the result of the calculation unit.

10. The radio communication apparatus as defined in claim 9 wherein the controlling includes limiting a specific function on the basis of the result of the calculation.

11. The method as defined in claim 9, further comprising:
communicating a specific function relating to security only when the relative distance is less than a prescribed value on the basis of the result of the calculation.

12. The method as defined in claim 9, wherein the controlling includes controlling power to reduce the sending power, and/or increase the transmission rate according to the result of the calculation, thereby intentionally making reception difficult for radio sets excluding a specific recipient.

13. The method as defined in claim 9, further comprising:
storing a list of neighboring radio sets and data of distance between the radio communication apparatus and the neighboring radio sets.

14. The radio communication apparatus as defined in claim 13, further comprising:
acquiring ranging information possessed by other radio sets; and
deriving the position of the radio communication apparatus relative to the neighboring radio sets from the acquired ranging information and the raging information of the radio communication apparatus.

15. The method as defined in claim 13, wherein each radio set position is derived from information pertaining to stationary radio sets.

16. The method as defined in claim 15, wherein each radio set position is derived from a combination of position information of three or more stationary radio sets with other map position information to map the position of the radio communication apparatus or the position of other radio sets on the basis of the position information of other two or more radio sets.

* * * * *